J. M. NAUL.
FLEXIBLE COUPLING.
APPLICATION FILED MAR. 10, 1916.

1,212,543.

Patented Jan. 16, 1917.

Inventor
James M. Naul
By his Attorneys

UNITED STATES PATENT OFFICE.

JAMES M. NAUL, OF PLAINFIELD, NEW JERSEY, ASSIGNOR TO BOSCH MAGNETO COMPANY, OF NEW YORK, N. Y., A CORPORATION OF NEW YORK.

FLEXIBLE COUPLING.

1,212,543.  Specification of Letters Patent.  Patented Jan. 16, 1917.

Application filed March 10, 1916. Serial No. 83,372.

*To all whom it may concern:*

Be it known that I, JAMES M. NAUL, a citizen of the United States, residing at and whose post-office address is 655 East Seventh street, Plainfield, county of Union, State of New Jersey, have invented certain new and useful Improvements in Flexible Couplings; and I do hereby declare the following to be a full, clear, and exact description of the invention, such as will enable others skilled in the art to which it appertains to make and use the same.

In mechanically connecting two shafts to drive one from the other, gearing elements such as gear wheels, pulleys, sprockets, or the like, are generally mounted on the driving and driven shafts, and in order to provide for slight variations from exact alinement between the axes of rotation, the driving motor or the driven device as the case may be, is usually connected to its shaft through a flexible coupling. However, this coupling sometimes requires more space along the shaft to one side of the gearing than is available for that purpose, especially if, in addition to the flexibility required to compensate for the slight disalinement, the coupling is required to provide sufficient flexibility to equalize the driving torque throughout the rotation, or to reduce the stress on the shafts when the driving motor is accelerated rapidly.

The invention herein disclosed is directed to an arrangement of this kind wherein the driving motor or the driven device may be located close to the gearing element and yet be coupled thereto through a coupling having the requisite flexibility. This result is attained in the preferred construction shown herein by extending the spring, or other part forming the flexible element of the coupling, through the gear wheel, pulley, sprocket or other part forming the gearing element on the driving or driven shaft, so that the flexible element occupies the axial space inside of the gearing element and possibly also a small additional amount of axial space on one or both sides thereof.

The accompanying drawings illustrate the preferred form of my invention in application, as an example, to a flexible coupling interposed between a gear wheel and an electric generator to be driven thereby.

Figure 1:
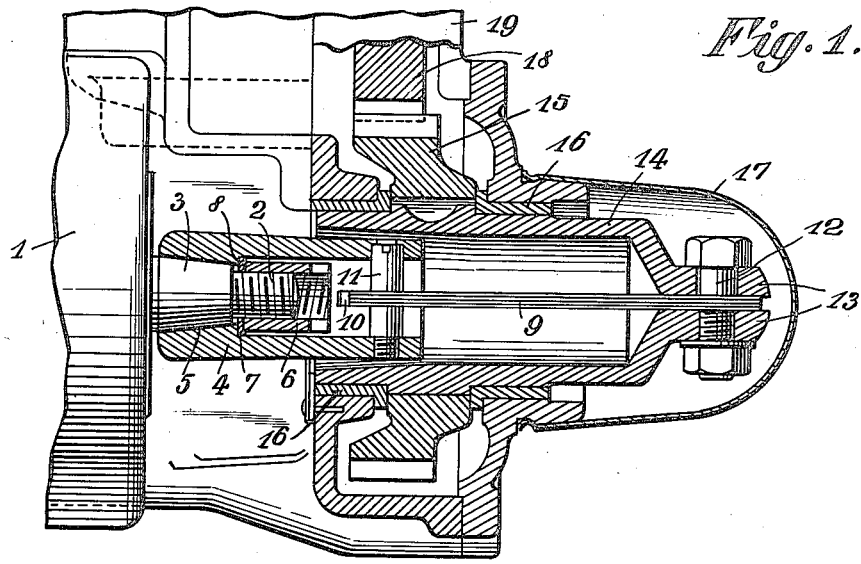
Figure 2:
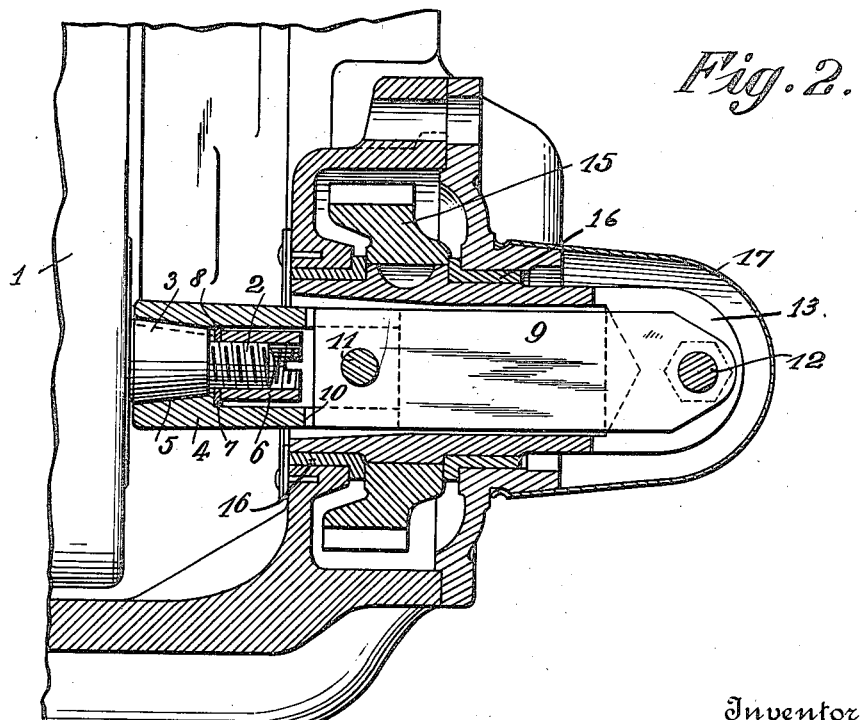

In these drawings, Figure 1 represents a central section through the coupling, and Fig. 2 represents a section at right angles to Fig. 1.

The rotatable shaft of the electric generator 1 has a screw threaded end 2 and a coned portion 3. The hollow cylindrical member 4 is provided with an internally coned portion 5 fitting loosely around the coned portion 3, and the hollow nut 6 engages the threaded end 2 of the shaft. The arrangement is such that when the hollow nut is screwed home, the washer 7 is clamped so tightly between the hollow nut and the internal shoulder 8 of the cylindrical member that the shaft of the generator 1 is then rigidly connected to the cylindrical member against relative movement in an axial direction. The flexible element of the coupling is made up of a number of flat metal springs 9 extending along the axis of rotation of the cylindrical member 4. The springs have a slight amount of play in the slot 10 of the cylindrical member, but are prevented from relative movement in an axial direction by the bolt 11 passing through the cylindrical member and the rear ends of the springs. The bolt 12 passes through the jaws 13 of the sleeve 14 and the forward ends of the springs, and rigidly clamps them together. This sleeve carries the gear 15 for rotation in the bearings 16. A conical-shaped cup 17 slips over the end of the forward bearing and snaps into place as shown. The gear 15 is driven by the gear 18 and the gearing is protected by the housing 19.

As a result of the foregoing construction, the axes of rotation of the generator 1 and the gear 15 may be slightly out of alinement, the resiliency of the springs 9 permitting the disalinement in one direction and the capability of the springs 9 to swing on the bolt 11 permitting disalinement in another direction. Thus the shaft of the generator 1 may be slightly out of exact alinement with the gear 15 in any angular direction, but the two are fastened together in the disalined position by the nut 6. By extending the flat springs through the gear 15 and also forward thereof, the electric generator 1 is located close to the gear, and the coupling has sufficient flexibility, in addition to that required to compensate for the disalinement, to reduce the torsional stress on the shafts under rapid acceleration, and to equalize the variable torque on the shaft of the electric generator even if that generator is a magneto for generating ignition voltages.

Having thus described my invention, what I claim is:

1. The combination with two rotatable members, of a flexible coupling therefor preventing axial separation of the members and permitting disalinement of the axes thereof in all angular directions, said coupling comprising a flexible element pivotally connected to one member and rigidly fastened to the other member.

2. The combination with two rotatable members, of a spring coupling therefor preventing axial separation of the members and permitting disalinement of the axes thereof in all angular directions, said coupling comprising a flat spring rigidly fastened to one member and pivotally connected to the other member.

3. The combination with two rotatable members, of a flexible coupling therefor preventing axial separation of the members and permitting disalinement of the axes thereof in all angular directions, said coupling comprising a cylindrical device connected to one member, a flexible element fastened to the other member and extending along the axis of rotation thereof, and a pivot pin extending through the flexible element and the cylindrical device.

4. The combination with a rotatable gearing element, and a rotatable device to be connected thereto, of a flexible coupling extending through the gearing element and having a flat spring pivotally fastened at one end to the shaft of the rotatable device, and a sleeve fastened to the other end of the spring and carrying the gearing element, the spring being capable of swinging movements in one direction and bending movements in another direction.

5. The combination with a rotatable gearing element, and a rotatable device having a shaft to be connected to the gearing element, of a flexible coupling extending through the gearing element and having a spring fastened thereto, said coupling also having a hollow cylindrical member to which the spring is pivotally connected and which is fastened to the shaft against relative movement in an axial direction, for the purpose described.

6. The combination with a rotatable gearing element, and a rotatable device having a shaft to be connected to the gearing element, of a flexible coupling extending through the gearing element and comprising a sleeve carrying the gearing element, a hollow cylindrical member fitting around the shaft and being fastened thereto against relative movement in an axial direction, and a spring having one end fastened to the sleeve and having the other end pivotally connected to the cylindrical member, for the purpose described.

In testimony whereof I affix my signature.

JAMES M. NAUL.